(12) United States Patent
Jang et al.

(10) Patent No.: US 12,065,529 B2
(45) Date of Patent: Aug. 20, 2024

(54) PURIFICATION METHOD OF SOLVENT

(71) Applicant: LG Chem, Ltd., Seoul (KR)

(72) Inventors: Sungkeun Jang, Daejeon (KR); Changhoe Heo, Daejeon (KR); Seonghun Kim, Daejeon (KR); Eun Jung Joo, Daejeon (KR); Donghoon Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 855 days.

(21) Appl. No.: 17/044,494

(22) PCT Filed: Nov. 27, 2019

(86) PCT No.: PCT/KR2019/016487
§ 371 (c)(1),
(2) Date: Oct. 1, 2020

(87) PCT Pub. No.: WO2020/130397
PCT Pub. Date: Jun. 25, 2020

(65) Prior Publication Data
US 2021/0115169 A1    Apr. 22, 2021

(30) Foreign Application Priority Data
Dec. 20, 2018  (KR) .................. 10-2018-0166726

(51) Int. Cl.
| | |
|---|---|
| C08F 6/06 | (2006.01) |
| B01D 3/32 | (2006.01) |
| B01D 5/00 | (2006.01) |
| C08F 6/04 | (2006.01) |
| C08F 6/10 | (2006.01) |

(Continued)

(52) U.S. Cl.
CPC ............... C08F 6/16 (2013.01); B01D 3/322 (2013.01); B01D 5/006 (2013.01); C08F 6/04 (2013.01); C08F 6/12 (2013.01)

(58) Field of Classification Search
CPC ... C08F 6/06; C08F 6/12; B01D 3/322; B01D 5/006
See application file for complete search history.

(56) References Cited

U.S. PATENT DOCUMENTS

| | | |
|---|---|---|
| 6,204,345 B1 | 3/2001 | Berthold et al. |
| 9,017,522 B2 | 4/2015 | Gildenhuys et al. |

(Continued)

FOREIGN PATENT DOCUMENTS

| | | |
|---|---|---|
| CN | 101808703 A | 8/2010 |
| CN | 103360194 A | 10/2013 |

(Continued)

OTHER PUBLICATIONS

Search report from International Application No. PCT/KR2019/016487, mailed Mar. 17, 2020.

(Continued)

*Primary Examiner* — Caixia Lu
(74) *Attorney, Agent, or Firm* — Lerner David LLP (57) ABSTRACT

The present disclosure relates to a purification method of a polymerization solvent used in and recovered from the preparation of a polyolefin resin, which can effectively remove impurities, in particular polyolefin wax, from the polymerization solvent to obtain a purified polymerization solvent with high purity, and can improve energy efficiency.

11 Claims, 2 Drawing Sheets

(51) Int. Cl.
*C08F 6/12* (2006.01)
*C08F 6/16* (2006.01)

(56) References Cited

U.S. PATENT DOCUMENTS

| | | |
|---|---|---|
| 2011/0046425 A1 | 2/2011 | Gartside et al. |
| 2011/0130604 A1 | 6/2011 | Gartside et al. |
| 2012/0199467 A1 | 8/2012 | Gildenhuys et al. |
| 2014/0150494 A1 | 6/2014 | Van Der Schrick |
| 2015/0259441 A1 | 9/2015 | Gupta et al. |
| 2017/0320796 A1 | 11/2017 | Lee et al. |
| 2018/0002458 A1 | 1/2018 | Setlhaku |
| 2018/0327522 A1* | 11/2018 | Al-Haj Ali ............... C08F 6/12 |
| 2019/0345080 A1 | 11/2019 | Rallapalli et al. |
| 2020/0070121 A1 | 3/2020 | Uhm et al. |

FOREIGN PATENT DOCUMENTS

| | | |
|---|---|---|
| CN | 106132533 A | 11/2016 |
| CN | 106794385 A | 5/2017 |
| CN | 107108785 A | 8/2017 |
| CN | 108774149 A | 11/2018 |
| EP | 0905152 A1 | 3/1999 |
| JP | 2003286202 A | 10/2003 |
| JP | 2017192868 A | 10/2017 |
| KR | 20070074949 A | 7/2007 |
| KR | 20080074507 A | 8/2008 |
| KR | 20120026051 A | 3/2012 |
| KR | 20170074658 A | 6/2017 |
| KR | 101809226 B1 | 12/2017 |
| KR | 20180057062 A | 5/2018 |
| WO | 2017108963 A1 | 6/2017 |
| WO | 2018104080 A1 | 6/2018 |
| WO | 2018116177 A1 | 6/2018 |
| WO | 2020135939 A1 | 7/2020 |

OTHER PUBLICATIONS

Search Report dated Sep. 18, 2022 from the Office Action for Chinese Application No. 201980020731.3 issued Oct. 9, 2022, pp. 1-2.

Extended European Search Report including Written Opinion for Application No. 19899659.7 dated Nov. 9, 2021, pp. 1-7.

* cited by examiner

PURIFICATION METHOD OF SOLVENT

CROSS-REFERENCE TO RELATED APPLICATIONS

The present application is a national phase entry under 35 U.S.C. § 371 of International Application No. PCT/KR2019/016487, filed on Nov. 27, 2019, which claims priority to Korean Patent Application No. 10-2018-0166726, filed on Dec. 20, 2018, the disclosures of which are incorporated herein by reference in their entirety.

TECHNICAL FIELD

The present disclosure relates to a purification method of a polymerization solvent used in the preparation of a polyolefin resin, which can effectively remove impurities, in particular polyolefin wax, from the polymerization solvent to obtain a purified polymerization solvent with high purity, and can improve energy efficiency.

BACKGROUND OF ART

Polyolefin resins are usually produced by homopolymerization of ethylene or copolymerization of ethylene and an alpha olefin having 4 to 8 carbon atoms. Such polymerization proceeds by solution polymerization, and a large amount of organic solvent is used as a polymerization solvent.

A waste polymerization solvent separated from the polyolefin resin after being used as the polymerization solvent may adversely affect the environment, and the amount of the polymerization solvent used may greatly affect economic efficiency of the process. Therefore, various attempts have been made to purify and recycle the waste polymerization solvent.

In order to reuse the waste polymerization solvent, impurities contained in the waste polymerization solvent should be removed. This is because side reactions may occur due to a hydrofluoric acid when reusing the polymerization solvent in which impurities remain, and the side reactions may adversely affect physical properties of the resulting polyolefin.

Specifically, the waste polymerization solvent recovered after the preparation of a polyolefin resin includes polyolefin wax having a lower molecular weight than that of the polyolefin resin, residual monomers having a low boiling point such as ethylene and alpha olefins, and oligomerization products of olefinic monomers as main impurities, and also includes other residual catalyst components as trace impurities.

In particular, a method including the following steps is used as the method for removing the polyolefin wax: separating a low boiling point-residual monomer-containing solvent vapor and a polyolefin wax-containing solution from the waste polymerization solvent, and then simply volatizing the wax from the polyolefin wax-containing solution, or removing the wax by directly injecting steam to the polyolefin wax-containing solution. However, these methods require a high initial investment because the number of devices required for wax removal is high, and operating costs may also be increased when the use of steam is increased.

Therefore, there is a continuing need for the development of energy efficient purification processes, which can effectively separate and purify main impurities including polyolefin wax from the waste polymerization solvent to obtain a purified polymerization solvent with high purity.

DETAILED DESCRIPTION OF THE INVENTION

Technical Problem

The present disclosure relates to a purification method of a polymerization solvent used in the preparation of a polyolefin resin, which can effectively remove impurities, in particular polyolefin wax, from the polymerization solvent to obtain a purified polymerization solvent with high purity, and can improve energy efficiency.

Technical Solution

According to the present disclosure, there is provided a method of purifying a polymerization solvent used and recovered from a preparation of a polyolefin resin,
wherein the polymerization solvent includes impurities containing at least polyolefin wax, residual monomers having a lower boiling point than that of the polymerization solvent and oligomerization products of olefins, and
the purification method includes the steps of:
separating the polymerization solvent from a reboiler by primary gas-liquid separation into a first vapor discharged from an upper part of the reboiler and a first solution containing polyolefin wax discharged from a lower part;
separating the first vapor from a distillation column by secondary gas-liquid separation into a second vapor discharged from an upper part of the distillation column, a purified polymerization solvent discharged from a lower side, and a second solution containing polyolefin wax discharged from a lower part and resupplied to the reboiler;
condensing the second vapor in a condenser to separate it into a third vapor containing residual monomers discharged from an upper part of the condenser and a third solution discharged from a lower part and resupplied to the distillation column; and
discharging the first solution and the third vapor.

Advantageous Effects

The purification method of a polymerization solvent used in the preparation of a polyolefin resin according to the present disclosure can effectively remove impurities, in particular polyolefin wax, from the polymerization solvent to obtain a purified polymerization solvent with high purity, and can improve energy efficiency.

DETAILED DESCRIPTION OF THE EMBODIMENTS

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the method for purifying a polymerization solvent according to specific embodiments of the present disclosure will be described in detail.

The terminology used herein is for the purpose of describing particular embodiments only and is not intended to be limiting of the invention. The singular forms are intended to include the plural forms as well, unless the context clearly indicates otherwise.

In addition, the term "upper" herein means a part corresponding to a height equal to or greater than 50% of the total height of a container or apparatus such as a reboiler, distillation column, or condenser. The term "lower" means a part corresponding to a height less than 50% of the total height of the container or apparatus. In addition, the "side" may be understood as a relative meaning for a part located on the side of the container or apparatus, compared to the front view of the container or apparatus where the "upper" and "lower" are located.

In addition, the term "polymerization solvent" herein may refer to a waste polymerization solvent recovered after being used in the preparation of a polyolefin resin.

In addition, the term "polyolefin" used herein may be understood to generically refer to polymers prepared by using olefins as monomers, and the polymers include polyethylene prepared by homopolymerization of ethylene, ethylene-alpha olefin copolymer prepared by copolymerization of ethylene and alpha olefin, and the like.

According to an embodiment, there is provided a method of purifying a polymerization solvent used and recovered from a preparation of a polyolefin resin, wherein the polymerization solvent includes impurities containing at least polyolefin wax, residual monomers having a lower boiling point than that of the polymerization solvent and oligomerization products of olefins, and the purification method includes the steps of: separating the polymerization solvent from a reboiler by primary gas-liquid separation into a first vapor discharged from an upper part of the reboiler and a first solution containing polyolefin wax discharged from a lower part; separating the first vapor from a distillation column by secondary gas-liquid separation into a second vapor discharged from an upper part of the distillation column, a purified polymerization solvent discharged from a lower side, and a second solution containing polyolefin wax discharged from a lower part and resupplied to the reboiler; condensing the second vapor in a condenser to separate it into a third vapor containing residual monomers discharged from an upper part of the condenser and a third solution discharged from a lower part and resupplied to the distillation column; and discharging the first solution and the third vapor.

Figure 1:
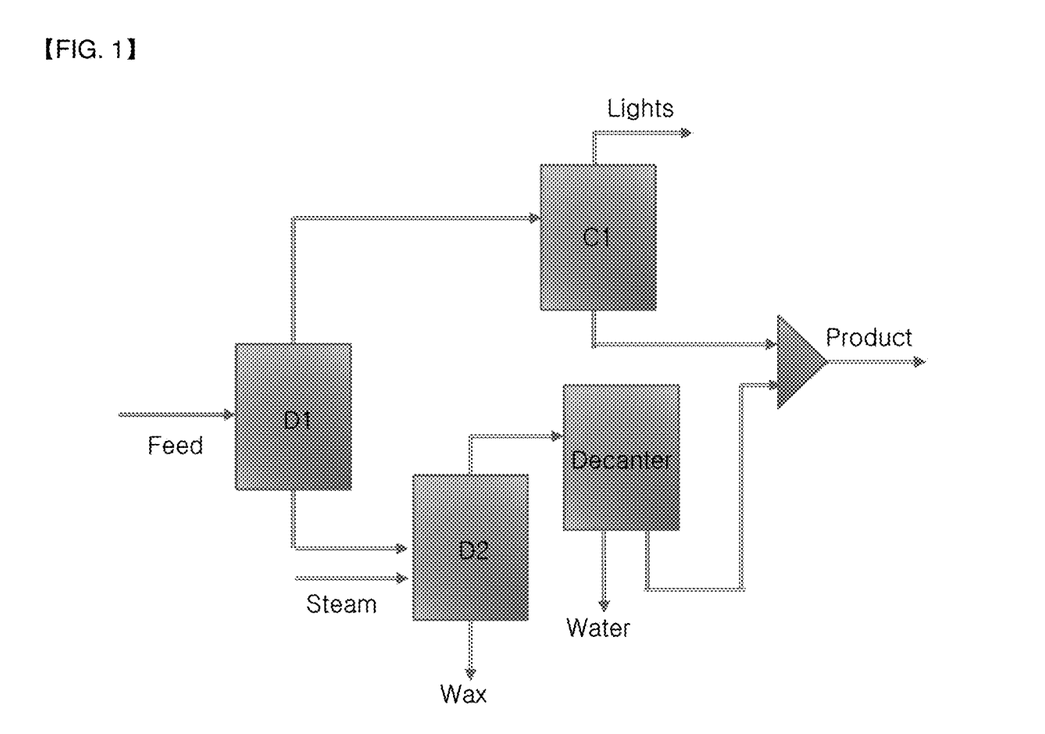
FIG. 1 is a schematic diagram schematically showing a conventional apparatus for purifying a solvent.

FIG. 1 schematically shows a schematic diagram of an apparatus for purifying a waste polymerization solvent previously applied. Referring to FIG. 1, the conventional purification apparatus includes first flash drums D1, second flash drums D2 and a solvent distillation column C1 connected to the first flash drum D1.

When using the purification apparatus, the waste polymerization solvent is separated into a low boiling point-residual monomer-containing solvent vapor and a polyolefin wax-containing solution through a gas-liquid separation step in the first flash drum D1, and the polyolefin wax-containing solution is again separated into a polyolefin wax-containing waste solution and a solvent vapor through an additional gas-liquid separation step in the second flash drum D2.

At this time, in the second flash drum D2, steam is directly supplied to the polyolefin wax-containing solution supplied from the first flash drum D1 for gas-liquid separation. Therefore, a large amount of steam is included in the solvent vapor discharged from the upper part of the second flash drum D2, and a decanter, which is a separate device for removing steam from the solvent vapor, is required.

In addition, the low boiling point-residual monomer-containing solvent vapor separated from the first flash drum D1 is supplied to the solvent distillation column C1, and the purified solvent is recovered from a lower part of the solvent distillation column C1 by a gas-liquid contact process. Then, the low boiling point-residual monomer and other impurities in the form of non-condensable gas are discharged from an upper part of the solvent distillation column C1.

Therefore, in the apparatus for purifying the waste polymerization solvent according to FIG. 1, the polyolefin wax-containing solution is discharged as the waste liquid and removed from a lower part of the second flash drum D2, and the purified solvent may be recovered at a lower part of the solvent distillation column C1 and at a lower part of the decanter and then reused.

However, in such a conventional purification process, since separate thermal energy should be supplied to each of the first and second flash drums D1 and D2 and the distillation column C1, a large amount of energy is consumed. In addition, due to the steam supply for separating the polyolefin wax-containing waste solution, a decanter, which is a separate device for removing the water contained in the solvent vapor, is required, resulting in a high initial investment and poor energy efficiency.

Figure 2:
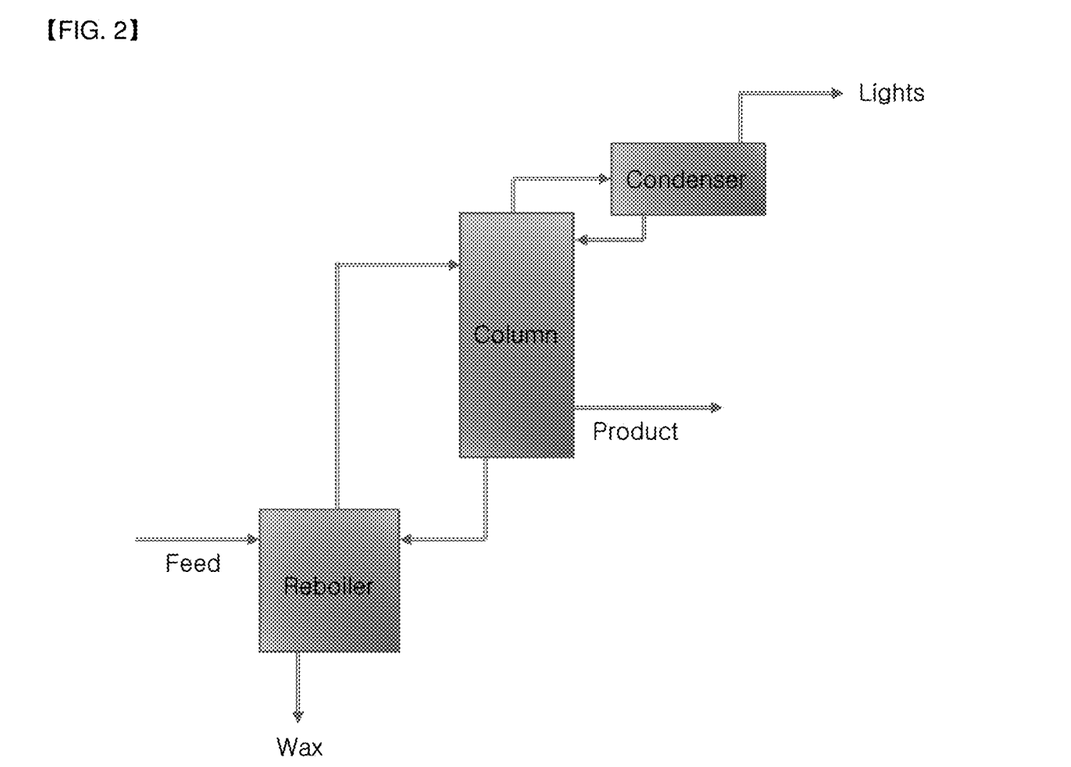
FIG. 2 is a schematic diagram schematically showing an apparatus for purifying a solvent applied to a purification method according to an embodiment of the present disclosure.

On the other hand, in the purification method of a solvent according to an embodiment of the present disclosure, the polymerization solvent used for preparing a polyolefin resin is directly supplied to a reboiler rather than the first and second flash drums D1 and D2, and separated and discharged into a low boiling point-residual monomer-containing solvent vapor and a polyolefin wax-containing waste solution from the reboiler. That is, by integrating the roles of the first and second flash drums, which have been conventionally required for separating the polyolefin wax-containing solution, into the reboiler and the distillation column, there is no need for the first and second flash drums, which are essentially required in the conventional purification apparatus of a solvent, so that the initial investment and utility usage may be reduced.

Moreover, since no steam supply is required directly to the polymerization solvent for the gas-liquid separation, no additional device such as a decanter for removing water is required.

In addition, the purified polymerization solvent is not discharged from a lower side of the distillation column, but the second solution containing polyolefin wax, which is resupplied to the reboiler, is discharged from the bottom of the distillation column. Thus, the polyolefin wax that has not been removed in the reboiler can be resupplied to the reboiler, whereby the polyolefin wax in the waste polymerization solvent can be effectively removed.

Since the purified polymerization solvent is recovered to a side stream at the lower side of the distillation column, it does not contain residual monomers having a low boiling point. Further, since the purification method of the present disclosure does not use steam, unlike the previous process of recovering the purified polymerization solvent at a lower side of the distillation column and/or at a lower part of the decanter, the purified polymerization solvent does not contain moisture, resulting in high purity.

Therefore, the purification method of a solvent according to an embodiment is simplified compared to the purification method using the conventional apparatus for purifying the waste polymerization solvent described above, and the number of devices required for the removal of the polyolefin wax-containing waste solution is reduced. Accordingly, the purified polymerization solvent may be obtained with high purity by effectively separating and purifying the main impurities including the polyolefin wax, and the energy efficiency may be further improved.

Hereinafter, with reference to the drawings, a purification method according to an embodiment will be described in more detail for each step. FIG. 2 schematically shows a schematic diagram of an apparatus for purifying a solvent applied to a purification method according to an embodiment of the present disclosure.

First, the polymerization solvent recovered after being used for preparing a polyolefin resin, i.e., a waste polymerization solvent, contains impurities including at least polyolefin wax, residual monomers having a lower boiling point than the polymerization solvent, and oligomerization products of olefins.

Specifically, a process for preparing a polyethylene resin by polymerizing ethylene and a process for preparing a polyolefin resin by copolymerizing ethylene and an alpha olefin having 4 to 8 carbon atoms, for example, copolymerizing ethylene and 1-butene, 1-hexene or 1-octene are usually performed by solution polymerization. In the solution polymerization, a hydrocarbon solvent such as pentane, hexane or heptane may be used. When the polyolefin resin, which is prepared by the solution polymerization, is recovered, the waste polymerization solvent may remain.

More specifically, in the case of preparing a polyethylene resin by homopolymerizing ethylene, the waste polymerization solvent may include polyolefin wax containing ethylene polymer-containing wax having a weight average molecular weight of 2,000 or less, or 100 to 1000, ethylene-containing residual monomers, and oligomerization products of olefins (e.g., C8 to C30 oligomer in which ethylene is polymerized) as main impurities.

Alternatively, in the case of preparing a polyolefin resin by copolymerizing ethylene and an alpha olefin having 4 to 8 carbon atoms, the waste polymerization solvent may include polyolefin wax containing ethylene-alpha olefin copolymer-containing wax having a weight average molecular weight lower than that of the polyolefin resin of 2,000 or less, or 100 to 1000, residual monomers having a lower boiling point than that of the polymerization solvent as ethylene and alpha olefins having 4 to 8 carbon atoms, and oligomerization products (e.g., C8 to C30 oligomer in which ethylene and alpha olefin having 4 to 8 carbon atoms are copolymerized) of olefinic monomers (ethylene and alpha olefin having 4 to 8 carbon atoms) as main impurities, and may also include other impurities such as residual catalysts.

That is, the residual monomer contained in the polymerization solvent recovered after being used for preparing a polyolefin resin, i.e., the waste polymerization solvent, may include ethylene or an alpha olefin having 4 to 8 carbon atoms. In addition, the oligomerization product of olefins contained in the waste polymerization solvent may include a C8 to C30 oligomer in which ethylene is polymerized or a C8 to C30 oligomer in which ethylene and an alpha olefin having 4 to 8 carbon atoms are copolymerized. Also, the polyolefin wax contained in the waste polymerization solvent may include ethylene polymer-containing wax or ethylene-alpha olefin copolymer-containing wax having a weight average molecular weight of 2,000 or less.

In the purification method of a polymerization solvent according to an embodiment, first, the waste polymerization solvent (Feed) is supplied to a reboiler and subjected to primary gas-liquid separation to be separated into a first vapor discharged from an upper part of the reboiler and a first solution containing polyolefin wax discharged from a lower part. That is, through this primary gas-liquid separation, the polyolefin wax having the relatively highest boiling point may be first separated as impurities and discharged from a lower part of the reboiler in liquid phase. In addition, the first vapor may mainly include residual monomers having a low boiling point and a polymerization solvent, and may contain a small amount of the polyolefin wax which is not properly separated and purified in the primary gas-liquid separation and other impurities.

At this time, since the oligomerization products may have various boiling points depending on the molecular weight, the number of carbon atoms, and the degree of polymerization, they may be partially included in the first vapor and the first solution, respectively.

Meanwhile, the gas-liquid separation in the reboiler may be carried out under appropriate conditions depending on the kind or boiling point of the solvent to be purified. For example, it may be carried out at a gas-liquid separation temperature of 110° C. to 150° C. and under a pressure of 0.4 kg/cm$^2$·g to 1.0 kg/cm$^2$·g, more specifically at a gas-liquid separation temperature of 120° C. to 145° C. and under a pressure of 0.5 kg/cm$^2$·g to 0.6 kg/cm$^2$·g.

Herein, the amount of heat required for the reboiler is supplied by passing MP steam (medium pressure steam) through a pipeline passing through a heat exchanger provided in the reboiler, and the MP steam provides heat energy to the reboiler by a heat exchanger. Then, the MP steam is discharged in the form of steam condensate or circulated to a preheater to be described later and reused.

Therefore, unlike the conventional process of FIG. 1, since the waste polymerization solvent does not directly contact steam, a decanter for removing moisture is not required, thereby reducing the initial investment and simplifying the process.

Accordingly, the first vapor and the first solution separated from the reboiler may not include water.

In addition, the polyolefin wax having a high boiling point among the impurities contained in the waste polymerization solvent cannot be vaporized in the reboiler, and if the polyolefin wax is vaporized, it may be discharged from a lower part through a distillation process in the distillation column and recirculated to the reboiler. Thus, the polyolefin wax may be separated at a high rate and discharged from the first solution. As a result, the overall purification efficiency may be increased, and a purified solvent with high purity may be obtained.

Meanwhile, if necessary, the method may further include a step of preheating the polymerization solvent in a preheater before supplying the polymerization solvent to the reboiler. The preheating step may be carried out at a temperature of 70° C. to 80° C. and under a pressure of 3 kg/cm$^2$·g to 5 kg/cm$^2$·g. When the preheated polymerization solvent is supplied to the reboiler, a significant amount of heat may be transferred to the reboiler. In addition, since steam condensate used in the reboiler is used as a heat source for the preheating step, an additional heat source for preheating may not be required. Accordingly, the energy efficiency of the entire process may be improved.

After the gas-liquid separation in the reboiler, the first vapor may be supplied to a distillation column and subjected to secondary gas-liquid separation by distillation. In the secondary gas-liquid separation, the first vapor may be separated into a second vapor discharged from an upper part of the distillation column, a purified polymerization solvent discharged from a lower side, and a second solution containing polyolefin wax discharged from a lower part and resupplied to the reboiler.

At this time, the second vapor may mainly include residual monomers having a low boiling point, and even in the secondary gas-liquid separation, oligomerization products may be partially included in the second vapor and the second solution, respectively, depending on the boiling point, as in the primary gas-liquid separation.

The purified solvent is discharged from a lower part of the conventional distillation column C1 of FIG. 1. On the contrary, since the polyolefin wax having a higher boiling point than that of the polymerization solvent and the residual monomers having a low boiling point is discharged from a bottom of the distillation column, and resupplied to the reboiler, most of the polyolefin wax may be removed before the purification of the solvent, and it is possible to obtain a purified polymerization solvent with high purity.

In addition, the purified polymerization solvent is discharged from a lower side of the distillation column, wherein the purified solvent may be separated from the second solution containing the polyolefin wax by a difference in boiling point and discharged from a side stream.

In addition, the first vapor having a relatively high temperature discharged from the reboiler may be supplied to the distillation column, so that a considerable amount of heat may be supplied to the distillation column and the heat can make the distillation step more efficient.

Specifically, the secondary gas-liquid separation by distillation in the distillation column may be carried out under a pressure of 0.1 kg/cm$^2$·g to 0.6 kg/cm$^2$·g, preferably 0.3 kg/cm$^2$·g to 0.5 kg/cm$^2$·g, so that the polyolefin wax, the solvent, the purified polymerization solvent and the residual monomers having a low boiling point can be effectively removed depending on the boiling point. The temperature may be controlled by the amount of heat supplied by the first vapor.

Meanwhile, after the secondary gas-liquid separation by distillation in the distillation column, the second vapor discharged from the upper part of the distillation column is supplied to a condenser to discharge residual monomers and other impurities in the form of non-condensable gas. That is, in the above step, the second vapor may be separated into a third vapor containing the residual monomers discharged from an upper part of the condenser, and a third solution containing the polymerization solvent discharged from a lower part and resupplied to the distillation column.

The third vapor may also contain some of the oligomerization products depending on their boiling points. That is, the oligomerization product may be included in at least one of the first solution discharged from the lower part of the reboiler and the third vapor discharged from the upper part of the condenser, and removed from the waste polymerization solvent.

Specifically, the second vapor discharged from the distillation column is high-temperature steam mainly containing residual monomers and containing a small amount of the polymerization solvent, and the second vapor may be cooled in a condenser and separated by a difference in temperature at which the polymerization solvent and the residual monomer condense, i.e., a difference in boiling point. That is, the polymerization solvent having a relatively high boiling point is condensed and resupplied to the distillation column as a third solution, and the residual monomers having a relatively low boiling point are present in a gaseous state and discharged as a third vapor.

At this time, recovering heat from the high-temperature second steam in the condenser may be performed by a reduced pressure condensation according to water cooling, and the reduced pressure condensation may be performed under appropriate conditions depending on the kind or boiling point of the solvent to be purified. For example, it may be carried out at a temperature of 60° C. to 80° C. and under a pressure of 0.3 kg/cm$^2$·g to 0.5 kg/cm$^2$·g, more specifically at a temperature of 60° C. to 70° C. and under a pressure of 0.35 kg/cm$^2$·g to 0.45 kg/cm$^2$·g.

Meanwhile, the first solution is discharged from a lower part of the reboiler as the waste liquid, and the third vapor is discharged from an upper part of the condenser and moved to a separate purification column for recovery.

Through this purification method of the waste polymerization solvent, it is possible to obtain a high-purity polymerization solvent in which various impurities, particularly polyolefin wax, are effectively removed. Specifically, the purified polymerization solvent obtained through the purification method according to an embodiment may include 50 ppm or less of polyolefin wax. Preferably, the purified polymerization solvent may include 20 ppm or less, 10 ppm or less, or 5 ppm or less of polyolefin wax. At this time, the content of the polyolefin wax may be inferred and calculated by measuring the amount remaining in the drum after evaporating the solvent from a sample of the purified solvent.

In addition, the purified polymerization solvent discharged from the lower side of the distillation column may be recycled to a polymerization reactor for preparing a polyolefin resin and reused.

Hereinafter, preferred Examples will be suggested for better understanding of the present disclosure. However, the following Examples are provided only for the purpose of illustrating the present disclosure, and thus the present disclosure is not limited thereto.

Comparative Example 1: Purification of Waste Polymerization Solvent

After preparing a polyolefin resin which becomes an ethylene polymer (polyethylene) under a hexane polymerization solvent, the polyolefin resin was recovered from the polymerization solution and a waste polymerization solvent was obtained.

A content of residual monomers having a low boiling point (Light) in impurities contained in the waste polymerization solvent (Feed) was analyzed by gas chromatography (GC), and summarized in Table 1 below. In addition, a content of polyolefin wax (Wax) having a weight average molecular weight of 100 to 1000 contained in the waste polymerization solvent (Feed) is difficult to accurately analyze. Accordingly, the waste polymerization solvent was partially sampled to evaporate impurities having a low boiling point such as the solvent, the residual monomers having a low boiling point and oligomerization products having 10 and 12 carbon atoms, and then the amount remaining in the drum was measured to infer and calculate the content of polyolefin wax.

Meanwhile, the waste polymerization solvent (Feed) was supplied to the purification apparatus shown in FIG. 1 to perform the purification of the solvent. The running conditions of the first flash drum D1, the second flash drum D2, and the distillation column C2 were summarized in Table 2 below.

After performing the purification, a purified solvent (Product, PRD) was obtained, and the content of residual monomers having a low boiling point (Light) and the content of polyolefin wax (Wax) in impurities contained in each of the purified solvent (PRD) and the waste liquid discharged from a lower part of the second flash drum D2 were identified and summarized in Table 1 below.

Specifically, the content of residual monomers having a low boiling point (Light) was analyzed by gas chromatography (GC). And the content of polyolefin wax (Wax) having a weight average molecular weight of 100 to 1000 was inferred and calculated by measuring the amount remaining in the drum after evaporating the solvent from each sample of the purified solvent (PRD) and the waste liquid, since it is difficult to accurately analyze.

TABLE 1

| Comparative Example 1 | Feed | PRD | Waste liquid |
|---|---|---|---|
| Light (wt %) | 0.4 | trace | 895 ppb |
| Wax (ppm) | 2610 | 91.3(2.48 kg) | 730605 |
| Total solvent loss (kg/hr) | | | 25.5 |

TABLE 2

| Comparative Example 1 | D1 | D2 | C1 |
|---|---|---|---|
| Temp. (° C.) | 113 | 90 | 78 |
| Pressure (kg/cm² · g) | 2.5 | 0.3 | 0.39 |
| Amount of heat supplied (Gcal/hr) | 2.81 | 0.23 | 0.6 |

Example 1: Purification of Waste Polymerization Solvent

After preparing a polyolefin resin which becomes an ethylene polymer (polyethylene) under a hexane polymerization solvent, the polyolefin resin was recovered from the polymerization solution and a waste polymerization solvent was obtained.

A content of residual monomers having a low boiling point (Light) in impurities contained in the waste polymerization solvent (Feed) was analyzed by gas chromatography (GC), and summarized in Table 3 below. In addition, a content of polyolefin wax (Wax) having a weight average molecular weight of 100 to 1000 contained in the waste polymerization solvent (Feed) is difficult to accurately analyze. Accordingly, the waste polymerization solvent was partially sampled to evaporate impurities having a low boiling point such as the solvent, the residual monomers having a low boiling point and oligomerization products having 10 and 12 carbon atoms, and then the amount remaining in the drum was measured to infer and calculate the content of polyolefin wax.

Meanwhile, the waste polymerization solvent (Feed) was supplied to the purification apparatus shown in FIG. 2 to perform the purification of the solvent. The running conditions of the reboiler, the distillation column, and the condenser were summarized in Table 4 below.

After performing the purification, a purified solvent (Product, PRD) was obtained, and the content of residual monomers having a low boiling point (Light) and the content of polyolefin wax (Wax) in impurities contained in each of the purified solvent (PRD) and the waste liquid discharged from a lower part of the reboiler were identified and summarized in Table 3 below.

Specifically, the content of residual monomers having a low boiling point (Light) was analyzed by gas chromatography (GC). And the content of polyolefin wax (Wax) having a weight average molecular weight of 100 to 1000 was inferred and calculated by measuring the amount remaining in the drum after evaporating the solvent from each sample of the purified solvent (PRD) and the waste liquid, since it is difficult to accurately analyze.

TABLE 3

| Example 1 | Feed | PRD | Waste liquid |
|---|---|---|---|
| Light (wt %) | 0.4 | 59.6 ppm | 30.4 ppm |
| Wax (ppm) | 2610 | 2.17(0.0063 kg) | 782367 |
| Total solvent loss (kg/hr) | | | 21.76 |

TABLE 4

| Example 1 | Reboiler | Column | Condenser |
|---|---|---|---|
| Temp. (° C.) | 120.8 | 79.2 | 61.4 |
| Pressure (kg/cm² · g) | 0.56 | 0.41 | 0.4 |
| Amount of heat supplied (Gcal/hr) | 3.0 | — | −2.91 |

Example 2: Purification of Waste Polymerization Solvent

A waste polymerization solvent (Feed) obtained by a lot different from Example 1 after the preparation of a polyolefin resin was purified in the same manner as in Example 1, except that the running conditions of the reboiler, the distillation column and the condenser were changed as shown in Table 6 below. The content of residual monomers having a low boiling point (Light) and the content of polyolefin wax (Wax) in impurities contained in each of the purified solvent (PRD) and the waste liquid discharged from a lower part of the reboiler were identified in the same manner as in Example 1, and summarized in Table 5 below.

TABLE 5

| Example 2 | Feed | PRD | Waste liquid |
|---|---|---|---|
| Light (wt %) | 0.4 | 51.2 ppm | 23.46 ppm |
| Wax (ppm) | 4988 | 2.06(0.06 kg) | 873267 |
| Total solvent loss (kg/hr) | | | 21.76 |

TABLE 6

| Example 2 | Reboiler | Column | Condenser |
|---|---|---|---|
| Temp. (° C.) | 143.3 | 79.2 | 61.4 |
| Pressure (kg/cm² · g) | 0.56 | 0.41 | 0.4 |
| Amount of heat supplied (Gcal/hr) | 3.5 | — | −3.4 |

Reference Example 1: Purification of Waste Polymerization Solvent

The waste polymerization solvent used in Example 1 was purified in the same manner as in Example 1, except that the running conditions of the reboiler, the distillation column and the condenser were changed as shown in Table 8 below. The content of residual monomers having a low boiling point (Light) and the content of polyolefin wax (Wax) in impurities contained in each of the purified solvent (PRD) and the waste liquid discharged from a lower part of the reboiler were identified in the same manner as in Example 1, and summarized in Table 7 below.

TABLE 7

| Reference Example 1 | Feed | PRD | Waste liquid |
|---|---|---|---|
| Light (wt %) | 0.4 | 69.8 ppm | 37.3 ppm |
| Wax (ppm) | 2610 | 103.8(3.04 kg) | 752567 |
| Total solvent loss (kg/hr) | | | 24.74 |

TABLE 8

| Reference Example 1 | Reboiler | Column | Condenser |
|---|---|---|---|
| Temp. (° C.) | 124.2 | 85.7 | 67.3 |
| Pressure (kg/cm² · g) | 0.86 | 0.7 | 0.7 |
| Amount of heat supplied (Gcal/hr) | 3.0 | — | −2.8 |

Referring to Tables 1 to 8, the purification method of Examples had a small amount of solvent loss and impurities, particularly polyolefin wax, more effectively removed while the amount of heat supplied to the overall purification apparatus was small, as compared with the purification method of Comparative Example. Thus, it was confirmed that a purified solvent purified by the purification method of Examples could be recovered with high purity. In addition, it was confirmed that the purification method of Examples recover a purified solvent with high purity and could reduce the amount of solvent loss, compared to the purification method of Reference Example, by controlling the pressure of the distillation column in an appropriate range.

DESCRIPTION OF SYMBOLS

D1: first flash drum
D2: second flash drum
C1, Column: distillation column
Decanter
Condenser
Reboiler
Feed: (waste) polymerization solvent
Light: containing residual monomers having a low boiling point
Wax: containing polyolefin wax
Steam: containing steam
Water: containing water
Product: purified (polymerization) solvent

The invention claimed is:

1. A purification method of a polymerization solvent, comprising:
   separating the polymerization solvent in a reboiler by primary gas-liquid separation into a first vapor discharged from an upper part of the reboiler and a first solution containing a polyolefin wax discharged from a lower part of the reboiler;
   separating the first vapor in a distillation column by secondary gas-liquid separation into a second vapor discharged from an upper part of the distillation column, a purified polymerization solvent discharged from a lower side of the distillation column, and a second solution containing the polyolefin wax discharged from a bottom of the distillation column and resupplied to the reboiler; and
   condensing the second vapor in a condenser to separate the second vapor into a third vapor containing residual monomers discharged from an upper part of the condenser and a third solution discharged from a lower part of the condenser and resupplied to the distillation column;
   wherein the purification method is a method of purifying the polymerization solvent used and recovered from a preparation of a polyolefin resin,
   wherein the polymerization solvent comprises impurities containing the polyolefin wax, residual monomers having a lower boiling point than that of the polymerization solvent and oligomerization products of olefins.

2. The purification method of a polymerization solvent of claim 1,
   wherein at least one of the first solution and the third vapor comprises the oligomerization products of olefins.

3. The purification method of a polymerization solvent of claim 1,
   wherein the residual monomers comprise ethylene, or an alpha olefin having 4 to 8 carbon atoms.

4. The purification method of a polymerization solvent of claim 1,
   wherein the oligomerization products of olefins comprises an oligomer having 8 to 30 carbon atoms in which ethylene is polymerized or an oligomer having 8 to 30 carbon atoms in which ethylene and an alpha olefin having 4 to 8 carbon atoms are copolymerized.

5. The purification method of a polymerization solvent of claim 1,
   wherein the polyolefin wax comprises ethylene polymer-containing wax having a weight average molecular weight of 2,000 or less or ethylene-alpha olefin copolymer-containing wax having a weight average molecular weight of 2,000 or less.

6. The purification method of a polymerization solvent of claim 1,
   wherein the gas-liquid separation in the reboiler is carried out at a gas-liquid separation temperature of 110° ° C. to 150° ° C. and under a pressure of 0.4 kg/cm²·g to 1.0 kg/cm²·g.

7. The purification method of a polymerization solvent of claim 1,
   wherein the first vapor and the first solution do not comprise water.

8. The purification method of a polymerization solvent of claim 1,
further comprising preheating the polymerization solvent in a preheater before supplying the polymerization solvent to the reboiler.

9. The purification method of a polymerization solvent of claim 1,
wherein the gas-liquid separation in the distillation column is carried out under a pressure of 0.1 kg/cm$^2$·g to 0.6 kg/cm$^2$·g.

10. The purification method of a polymerization solvent of claim 1,
wherein the condensation in the condenser is carried out at a temperature of 60° C. to 80° C. and under a pressure of 0.3 kg/cm$^2$·g to 0.5 kg/cm$^2$·g.

11. The purification method of a polymerization solvent of claim 1,
further comprising recycling the purified polymerization solvent discharged from a lower side of the distillation column to a polymerization reactor for preparing a polyolefin resin to reuse.

\* \* \* \* \*